United States Patent [19]

Shinbo et al.

[11] Patent Number: 4,656,561
[45] Date of Patent: Apr. 7, 1987

[54] DEVICE FOR ILLUMINATING MEASURING INSTRUMENTS

[75] Inventors: Shintaro Shinbo; Yasuo Saito, both of Nagaoka, Japan

[73] Assignee: Nippon Seiki Corporation, Nagoaka, Japan

[21] Appl. No.: 635,354

[22] Filed: Jul. 27, 1984

[30] Foreign Application Priority Data

Nov. 25, 1983 [JP] Japan .................... 58-182524[U]

[51] Int. Cl.⁴ .............................................. G01D 11/28
[52] U.S. Cl. ..................................... 362/30; 73/431;
362/221; 315/85; 313/115
[58] Field of Search ............... 315/85; 313/15, 44,
313/313; 362/23, 26, 28, 29, 30, 221, 265, 253,
812, 457, 458; 73/431

[56] References Cited

U.S. PATENT DOCUMENTS

| 2,581,959 | 1/1952 | Koehler | 313/15 |
| 2,653,270 | 9/1953 | Kompfner | 315/85 |
| 2,845,474 | 7/1958 | Langworthy | 313/313 |
| 3,779,640 | 12/1973 | Kidd | 313/15 |
| 3,867,623 | 2/1975 | Widlund | 362/30 |
| 3,996,493 | 12/1976 | Davenport | 362/221 |
| 4,033,191 | 7/1977 | Kreuz | 73/431 |
| 4,419,719 | 12/1983 | Boer | 362/221 |
| 4,504,891 | 3/1985 | Mazis | 362/221 |

FOREIGN PATENT DOCUMENTS

| 1161927 | 3/1958 | France | 362/29 |
| 125344 | 12/1959 | France | 315/85 |

Primary Examiner—Carl Stuart Miller
Attorney, Agent, or Firm—Lowe, Price, Leblanc, Becker & Shur

[57] ABSTRACT

A cold cathode discharge tube is disposed as a light source on the front side of a display unit, and a grounded connector is disposed on and/or in the neighborhood of the outer periphery of the cold cathode discharge tube. The conductor causes electric noise generated from the cold cathode discharge tube to flow to the ground, thus preventing the rupture and erroneous operations of the liquid crystal display unit accommodating driving ICs.

10 Claims, 4 Drawing Figures

DEVICE FOR ILLUMINATING MEASURING INSTRUMENTS

BACKGROUND OF THE INVENTION

This invention relates to a device for illuminating measuring instruments and, more particularly, to a measuring instrument illuminating device of the type which uses a cold cathode discharge tube as a light source and in which electric noise generated from said cold cathode discharge tube is prevented from being given to instrument display unit.

PRIOR ART

U.S. Pat. Nos. 3,867,623 and 4,033,191 disclose devices for illuminating measuring instruments, in which a display unit is illuminated from the back side by light from a lamp or the like so that it is seen from the front side. In large scale display sections where a plurality of measuring instruments are collectively accommodated in a case for illumination, the illumination is spotted in case where the display unit is illuminated from the back side. Accordingly, there has been adopted a method, in which an elongate light source is provided on the front side of the unit for illumination. In the case where the elongate light source is a fluorescent lamp, which utilizes a coil heater, it is liable that the light emission is insufficient when the temperature is low in cold districts. In such a case, sufficient illumination effect cannot be obtained. In addition, the structure has low mechanical strength against vibrations, readily resulting in the deformation of the shape of the coil to curtail the life. For this reason, use is made of a cold cathode discharge tube as the elongate light source, which has high mechanical strength and long life, and the disadvantage that the illumination intensity is reduced with reducing temperature is overcome by the provision of a heating mechanism.

The cold cathode discharge tube, however, is driven by an alternating voltage at approximately 1 kV (peak-to-peak) at a frequency f of 20 to 40 kHz. Therefore, electric noise is generated due to the discharge and is liable to destruct driving ICs for the fluorescent display tube, EL display unit, liquid crystal display unit, etc. or cause erroneous operation of other electric parts.

SUMMARY OF THE INVENTION

An object of the invention is to provide a device for illuminating measuring instruments, a grounded conductor is provided on and/or in the neighborhood of the outer periphery of the cold cathode discharge tube provided on the front side of a display unit, for the measuring instruments thereby preventing electric noise generated from the cold cathode discharge tube from flowing to the display unit.

The above and other objects, features and advantages of the present invention will become more apparent from the following description when taken in conjunction with the accompanying drawings in which preferred embodiments of the present invention are shown by way of illustrative example, and like reference characters designate like parts.

DETAILED DESCRIPTION OF THE PREFERRED EMBODIMENTS

Figure 1:
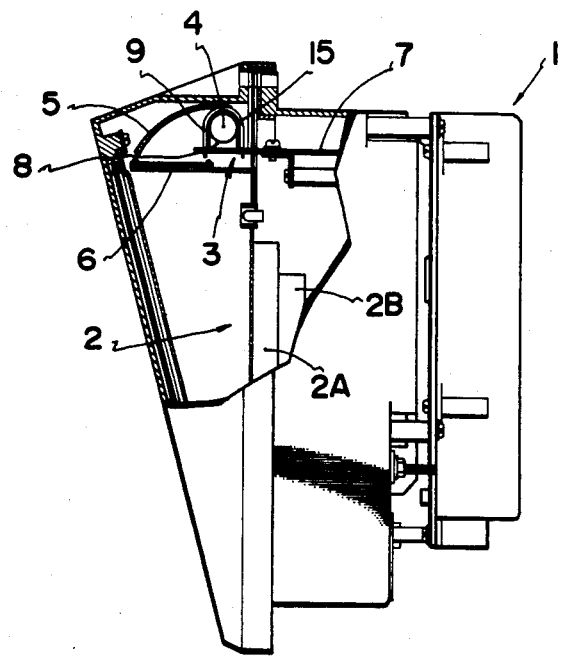
FIG. 1 is a partly broken-away front view showing a device for illuminating measuring instruments according to the invention.

Referring to FIG. 1, there is shown an instrument housing 1, in which a display unit 2 and an illuminating unit 3 are accommodated. The display unit 2 includes a display section 2A consisting of liquid crystal elements and a driving circuit 2B for driving the display section 2A. The illuminating unit 3, a detail of which is described hereafter, is disposed on the front side of the display section 2A. Light emitted from the cold cathode discharge tube 4 is reflected by a reflector 5 made of metal. The reflected light is passed through a filter 6, which directs light in the direction of the display section 2A, for illuminating the display section 2A.

Figure 2:
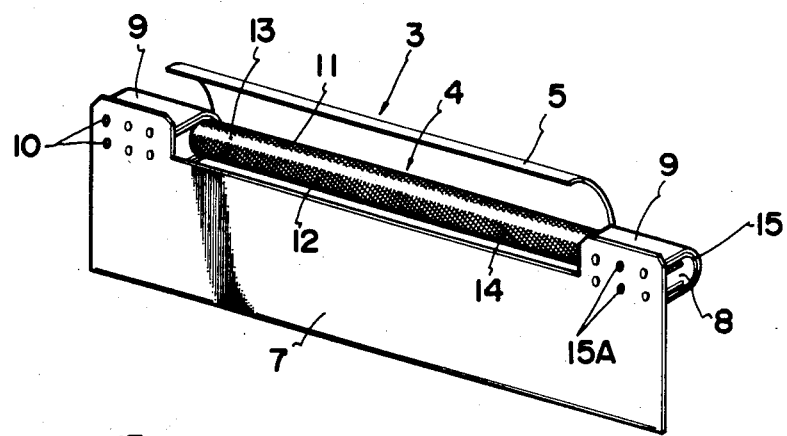
FIG. 2 is a perspective view showing the illuminating device.

As shown in FIG. 2, a printed circuit board 7 contains a circuit for driving a cold cathode discharge tube 4 (hereinafter referred to as discharge tube) as a light source. The reflector 5 is integral with metal members 9 which are fitted on sockets 8 on the opposite sides of the discharge tube 4. Protuberances 10 are formed at the opposite ends of the metal members 9. They are inserted through the printed circuit board 7 and are soldered to the grounding wire of the printed circuit board 7.

Figures 3, 4:
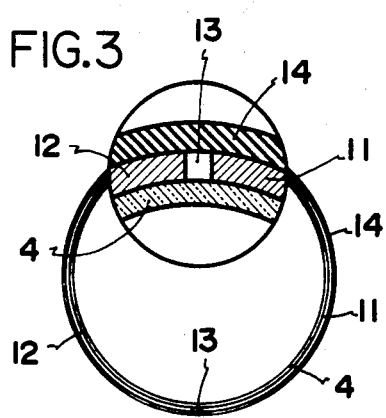
FIG. 3 is a sectional view, partly on an enlarged scale, showing a cold cathode discharge tube.
FIG. 4 is a sectional view, partly on an enlarged scale, showing a different embodiment of the cold cathode discharge tube according to the invention.

As shown in FIG. 3, a semi-cylindrical mesh heater 11 and a semi-cylindrical conductive mesh 12 of said conductive layer are arranged circumferentially on the outer periphery of said discharge tube 4 with a slit 13 formed between them, and they are covered by a thermally contractable and insulating tube 14.

The mesh heater 11 is located on the side opposite the reflector 5 and is connected to the power source via a lead chord (not shown). The mesh 12, on the other hand, is located on the side of the display section 2A opposite the reflector 5, and it is connected to the grounding wire of the printed circuit board 7. The mesh heater 11 and mesh 12 are provided over the entire length of the discharge tube 4 and extends up to the sockets 8. Between the sockets 8 and metal members 9 are provided retaining members 15 made of metal for securing the discharge tube 4 to the printed circuit board 7. The retaining member 15 has protuberances 15A that are formed on the opposite ends, these protuberances being inserted in the printed circuit board 7 and soldered to the grounding wire thereof. The printed circuit board 7 and the grounding wire of the display driving circuit 2B are desirably connected to each other.

The operation of the embodiment of the above construction will be described.

When a driving voltage is applied to the discharge tube 4, the discharge tube 4 is turned on, whereby the display section 2A is illuminated to make the display section 2A visible at night. In such a case, the discharge tube 4 generates the electric noise due to the discharge, the noise being liable to affect harmfully operation of the display driving circuits 2B.

Since the electric noise is generated from the discharge tube 4, particularly from the opposite end portions thereof, the retaining members 15 fitted on the sockets 8 on the opposite sides of the discharge tube 4 and the metal members 9 provided on the members absorb noise generated at the opposite ends of the discharge tube 4 to cause to flow to the ground. Also, the mesh 12 covering the portion of the discharge tube 4 on the side of the display section 2A absorbs noise in the direction toward the display section 2A to the grounding wire. Further, noise generated from the portion of the discharge tube 4 on the side of the reflector 5 is absorbed by the reflector 5 and caused to flow through the integral metal members 9 to the grounding wire.

As has been shown, the noise generated from the discharge tube 4 is absorbed by the mesh 12, reflector 5, metal members 9 and a shield covering the entirety of the discharge tube 4, so that it is prevented from flowing to the display driving circuit 2B. In this embodiment, the mesh heater 11 is heated by a power source to prevent deterioration of the illumination intensity of the discharge tube 4 due to a low ambient temperature.

In the above embodiment, the noise absorption mesh 12 and mesh heater 11 are provided on the opposite sides of the outer periphery of the discharge tube 4 and are covered by the thermally contractable and insulating tube 14. However, as shown in FIG. 4, it is possible to wind a mesh heater 11 at least once on the outer periphery of the discharge tube 4 and wind thereon the thermally contractable and insulating tube 14, a noise absorption mesh 12 and the contractable and insulating tube 14 one on the other in the mentioned order at least once. Further in the above embodiment the retaining members 15 are fitted on the sockets 8 to secure the discharge tube 4 to the printed circuit board 7. With the mesh 12 and mesh heater 11 accommodated in the tube 14, which is an insulator, the tube 14 may be covered inclusive of the sockets 8 at the opposite ends of the tube 4 without possibility of short-circuit to the retaining members 15. Further, in the above embodiment the mesh 12 is used as a conductive layer. However, it is possible to use a conductor of any other shape than the mesh.

As has been described in the foregoing, according to the invention the cold cathode discharge tube is covered by a mesh which is grounded, permitting electric noise generated from the cold cathode discharge tube to flow to the ground. Thus, it is possible to solve the problem of rupture of driving ICs constituting the display unit of mesuring instruments due to electric noise.

While a preferred embodiment of the invention and some modifications thereof have been described, it is to be understood that various other changes and modifications may be done without departing from the scope and spirit of the invention.

What is claimed is:

1. A device for illuminating measuring instruments including a display unit driven by a display driving circuit and a cold cathode discharge tube mounted on a printed circuit board in order to illuminate said display unit from a display side thereof comprising:
   a conductive layer arranged circumferentially on at least the display side of the outer periphery of said cold cathode discharge tube and grounded to a grounding level of said display driving circuit in order to absorb noise generated in an outwardly direction,
   a heater arranged circumferentially on the outer periphery of said cold cathode discharge tube and insulated from said conductive layer,
   metal members disposed on said printed circuit board, provided at opposite ends of said cold cathode discharge tube and grounded to the grounding level of said conductive layer to absorb noise generated in an outwardly direction, and
   a reflector provided against a portion of said cold cathode discharge tube opposite said display unit and reflecting light emitted from said cold cathode discharge tube to said display unit.

2. The device for illuminating measuring instruments according to claim 1, wherein said conductive layer and said heater are each in the form of a mesh, said conductive layer arranged on a semi-cylindrical portion of the display side of said cold cathode discharge tube and said heater arranged on another semi-cylindrical portion of said cold cathode discharge tube.

3. The device for illuminating measuring instruments according to claim 1, wherein said conductive layer and said heater are each in the form of a mesh and are arranged circumferentially on the outer periphery of said cold cathode discharge tube with an insulating tube formed therebetween, further comprising another insulating tube formed on the outer periphery.

4. The device for illuminating measuring instruments according to claim 1, wherein said metal member comprise protuberances which are inserted in said printed circuit board and fixed thereto.

5. The device for illuminating measuring instruments according to claim 1, wherein said reflector is made of metal and is integral with said metal members.

6. The device for illuminating measuring instruments according to claim 4, wherein said metal members are connected at the fixed parts thereof to said printed circuit board and to a grounding level thereof.

7. In a device for illuminating measuring instruments including cold cathode discharge means for illuminating a display unit of an instrument, the improvement comprising:
   frontal means for frontally illuminating the display unit from a viewing side thereof,
   driving circuit means for driving said cold cathode discharge means,
   said frontal means and said driving circuit means mounted on a common printed circuit board,
   said frontal means including reflector means including a plurality of protuberance means for insertion in said common printed circuit board for mounting said reflector means thereto,
   said reflector means including metal members at opposite ends of said cold cathode discharge means, said protuberance means projecting from said metal members for insertion through said printed circuit board.

8. An improved device for illuminating measuring instruments as recited in claim 7, wherein said protuberance means includes a plurality of proturberances affixed to a grounding wire of said printed circuit board.

9. An improved device for illuminating measuring instruments as recited in claim 7, wherein said metal members are connected to respective socket means on opposite ends of said cold cathode discharge means and further comprising retaining means, between respective ones of said socket means and metal members, for securing said cold cathode discharge means to said printed circuit board.

10. An improved device for illuminating measuring instruments as recited in claim 9, comprising further protuberance means on opposite ends of said retaining means for insertion in said printed circuit board and for affixation to a grounding wire thereof.

* * * * *